United States Patent [19]

Cramer

[11] Patent Number: 4,654,020
[45] Date of Patent: Mar. 31, 1987

[54] V-BELTING

[76] Inventor: Scott L. Cramer, W28335 Weber Ave., Hartland, Wis. 53029

[21] Appl. No.: 821,250

[22] Filed: Jan. 22, 1986

[51] Int. Cl.$^4$ .............................................. F16G 3/08
[52] U.S. Cl. ................................................. 474/257
[58] Field of Search ................ 474/253, 255, 256, 257

[56] References Cited

U.S. PATENT DOCUMENTS

| | | | |
|---|---|---|---|
| 948,350 | 2/1910 | Skidmore | 474/257 |
| 1,402,560 | 1/1922 | Anthony | 474/257 |
| 2,362,949 | 11/1944 | Tingley et al. | 474/257 X |
| 2,847,864 | 8/1958 | Waugh | 474/257 |
| 3,748,699 | 7/1973 | Cunningham | 24/38 |
| 4,254,666 | 3/1981 | Seredick | 474/253 |
| 4,437,849 | 3/1984 | Berg | 474/256 |
| 4,445,877 | 5/1984 | Love | 474/253 |

FOREIGN PATENT DOCUMENTS 585743 2/1947 United Kingdom ................ 474/253

*Primary Examiner*—James A. Leppink
*Assistant Examiner*—John F. Letchford
*Attorney, Agent, or Firm*—Willis B. Swartwout, III

[57] ABSTRACT

An improved automotive type V-belt being of a truncated trapezoidal shape in cross-sectional dimension, the belting being endless and molded or otherwise formed around a flexible metal or plastic strapping type material, the strapping material being similarly endless and having evenly longitudinally spaced apertures throughout its length. The belting can be cut to any desired length, the belting drawn back from the strapping and the ends of the strapping suitably joined with a fastener through the apertures, after which the belting ends may be released to again cover the strapping and meet in end to end smoothly abutting relationship.

2 Claims, 5 Drawing Figures

V-BELTING

BACKGROUND OF THE INVENTION

There are presently a number of very severe and costly problems in the area of belt driven equipment, particuarly automobiles. While almost all so-called V-belting is truncated trapezoidal shaped in cross-sectional dimension therethrough, there are about a dozen or less variations in the trapezoidal area. However, the big problem with such belts is that there are an infinite number of belt sizes in use, particularly in the automotive field. Therefore, automotive parts houses and service stations as well as repair shops must either carry very large inventories of these belts or be constantly chasing these parts.

Additionally, particularly with automotive equipment it is often required that one or two perfectly good belts must either be temporarily removed or replaced entirely simply to replace the worn or broken belt incurring more time and increased labor costs.

SUMMARY OF THE INVENTION

The present invention is endless V-belting preferably in rolls. The belting is made from the composition of materials presently used in V-belting. The V-belting is molded, extruded or otherwise formed in the usual manner in elongated strands and in vertical cross-section therethrough being of a truncated trapezoidal shape. An elongated thin flat flexible core of strapping plastic or metal material is molded into the center of the belting. The strapping material is provided along its longitudinal centerline axis with an evenly spaced endless succession of apertures.

When it is desired to make or replace a V-belt, a suitable length of the belting is cut from a roll of the material, the ends of the belting are pushed back from the strapping material for a sufficient distance to expose two apertures, one at each end of the piece. The strapping is overlayed or overlapped such that the two apertures register. A rivet or crimp joiner is used to join the strap ends together after which the belting is allowed to recover the strapping forming an abutting joint and a completed belt for use and which operates smoothly on pulleys. Any other suitable joiner may be used if preferred to a rivet or crimp joiner.

The present invention proposes to overcome the aforementioned problems of the prior art by providing belting of the appropriate area dimensions in cross-sectional configuration therethrough in endless rolls or lengths, which can be readily cut to the desired length and the ends joined in secure abutting relationship.

It is, therefore, an object of the present invention to provide belting of the character described wherein the belting is molded, extruded or otherwise formed in the desired cross-sectional dimension about a flexible metal, plastic or other strapping material which is flat, elongated co-extensively with the belting material, the strapping material being provided along its longitudinal centerline with an endless number of evenly longitudinally spaced apertures.

It is another object of the present invention to provide belting of the character described, wherein the belting is made from a composition of material sufficiently deformable as to permit it to be pushed or drawn back enough to expose the ends of the strapping when a piece is cut from the bulk belting.

It is still a further object of the present invention to provide belting of the character described wherein the exposed strapping ends may be joined by simply overlaying or overlapping the ends until two apertures register and joining the strapping and thereby the belting by the use of a rivet, crimp joiner or other suitable joining means.

The foregoing and other objects and advantages of the present invention will appear from the following description reference is made to the accompanying drawings which form a part hereof and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
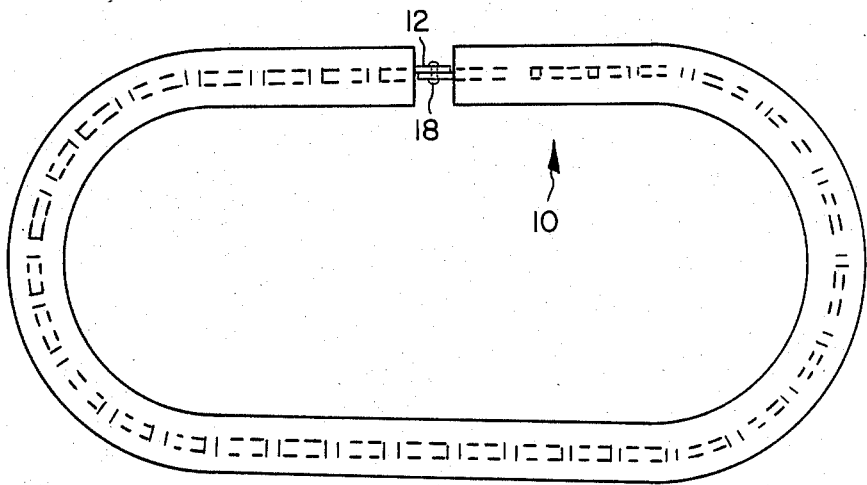
FIG. 1 is a top plan view of a belt formed from belting of the present invention with the joined ends exposed.

Referring now to the drawings and more particularly to FIG. 1 thereof, a belt is shown and generally identified by the numeral 10. Belt 10 is formed from customarily used belting materials which are flexible and somewhat deformable. Such belting material is usually either molded or extruded.

Figure 3:
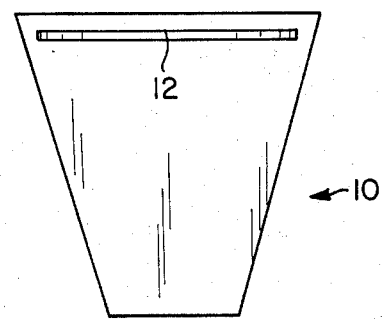
FIG. 3 is an enlarged cross-section through the belting shown in FIG. 1.

By referring to FIG. 3 of the drawings, it can be seen that the belting is vertical cross-sectional dimension therethrough is generally trapezoidal in shape.

By referring to all the views it can be seen that there is disposed within the belting material, strapping identified by the numeral 12. Strapping 12 is ideally made from a flexible metal or plastic material. In cross-sectional dimension the strapping 12 is quite flat and thin, but in plan it is just slightly narrower than the widest portion of the trapezoid. The strapping 12 is embedded when the belting is formed throughout the length of the belting.

Figure 4:
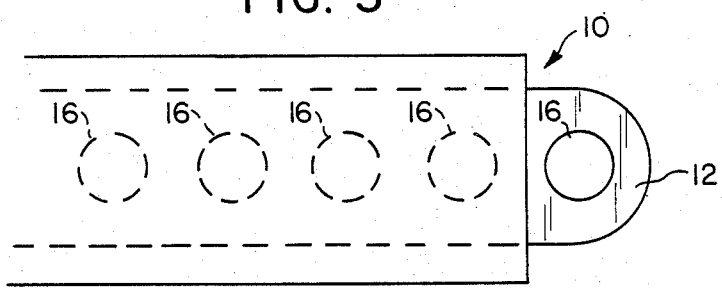
FIG. 4 is a top plan view of a segment of belting as shown in FIG. 1 with dotted line used to show the embedded strapping material.
Figure 5:
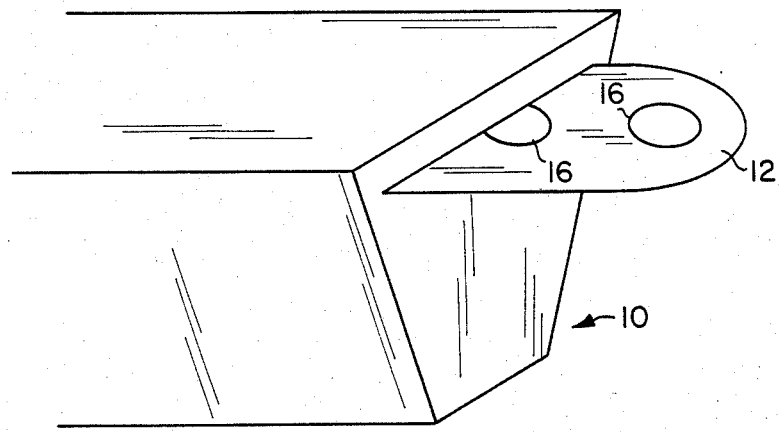
FIG. 5 is an isometric view of an end segment of belting embodying the present invention with the strapping exposed or protruding.

Referring now most particularly to FIGS. 1 and 4 of the drawings, it will be seen that the strapping is provided with a plurality of evenly spaced apertures 16 along the longitudinal axis of the strapping as shown in top plan.

It can be easily seen that if belting as described is made in relatively endless lengths such as rolls of many feet in length, a user may simply use his old belt or measure the belt length, cut off the desired length from the roll and join the ends of the piece together.

Figure 2:
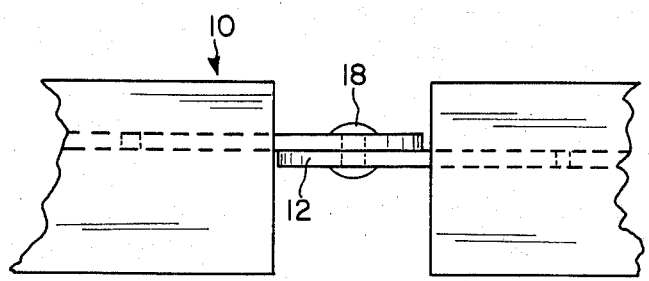
FIG. 2 is an enlarged cross-section through the belting shown in FIG. 1.

As can be seen by referring to FIGS. 1 and 2 of the drawings, one end of strapping 12 is overlayed or overlapped over the other end until two apertures 16 register. A rivet 18 or other similar joiner may then be inserted through the registering apertures 16 and secure the ends of strapping 12 together. In order to accomplish the joining ends of the deformable belting 10 are pushed back to expose sufficient strapping to accomplish the joint. When the deformed ends of belting 10 are released, the ends will move convergingly towards each other into abutting relationship to form a smooth belt surface.

With my invention it is easy to see that a relatively small inventory of belting will be required and belt replacement can a be easily and quickly accomplished without the requirement of removing any intervening belts.

I claim:

1. Automotive belting comprising:
  (a) an endless strip of composition belting trapezoidal in cross-sectional dimension;
  (b) said belting continuously circumscribing an elongated flat flexible joinder strapping slightly lesser in width than the widest parallel wall of said trapezoid but disposed within said belting adjacent said wall;
  (c) said strapping being provided with equidistantly spaced apertures throughout the entire length of its longitudinal centerline axis;
  (d) said composition belting being deformable so that it may be manually pushed back along each end of a segment of said belting to expose sufficient strapping to expose at least one said longitudinal aperture at each end of a segment for interconnecting said ends.

2. The structure as set forth in claim 1, wherein said exposed strapping ends are overlayed until said apertures register and a fastener is permanently secured through said apertures to hold said strapping in overlayed position.

* * * * *